No. 777,610. PATENTED DEC. 13, 1904.
R. E. DEANE.
APPARATUS FOR BOILING EGGS.
APPLICATION FILED FEB. 26, 1904.
NO MODEL.
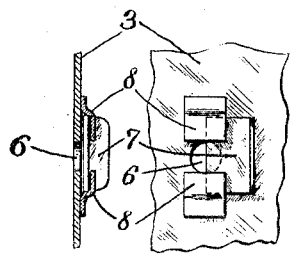
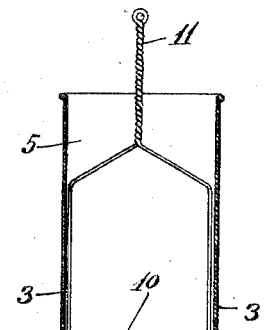
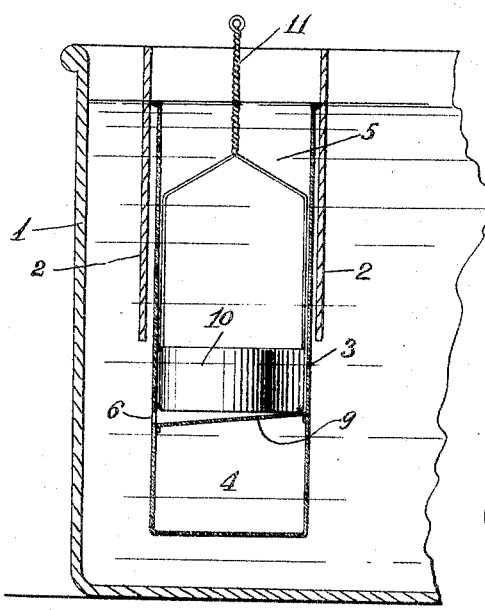
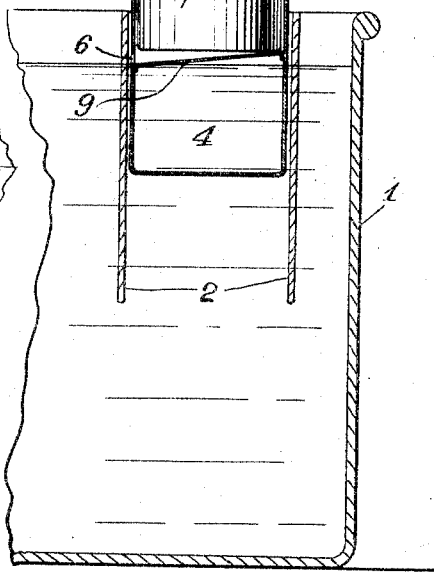
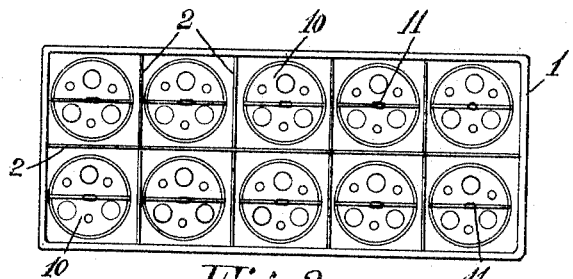
Witnesses
Julian F. Wooster
L. K. Sager
Royal E. Deane Inventor
By his Attorney
C. W. Edwards No. 777,610.

Patented December 13, 1904.

UNITED STATES PATENT OFFICE.

ROYAL EARL DEANE, OF NEW YORK, N. Y.

APPARATUS FOR BOILING EGGS.

SPECIFICATION forming part of Letters Patent No. 777,610, dated December 13, 1904.

Application filed February 26, 1904. Serial No. 195,346. (No model.)

*To all whom it may concern:*

Be it known that I, ROYAL EARL DEANE, a citizen of the United States, residing at New York, in the county of New York and State of New York, have invented certain new and useful Improvements in Apparatus for Boiling Eggs, of which the following is a full, clear, and exact specification.

This invention relates to apparatus for boiling eggs, and has especial reference to that class of devices which are operated automatically at a definite time to withdraw the eggs from the water to prevent further cooking.

According to this invention I dispense with all outside mechanism for raising the egg-carrier by mounting the latter on a float and providing means for holding the float and the egg-carrier submerged until after a definite time has elapsed, when the float is permitted to lift the egg-carrier out of the water. To this end I provide a reservoir which can be filled with water to submerge the float, the water being permitted to escape gradually from the reservoir, so as to allow the float to rise. Means is also provided for varying the rapidity of discharge from the reservoir, so that the eggs or other articles may be cooked to any desired degree.

The principle of the invention, therefore, may be briefly described as the control of an egg-carrier by a float combined with an automatically-varied load. By noting the position of the carrier in the containing vessel it can be readily seen when the desired time has elapsed.

The invention will be more particularly described in the accompanying drawings, in which—

Figure 1 is a sectional view showing the device immersed for boiling eggs. Fig. 2 is a similar view showing the apparatus when the operation is complete. Fig. 3 is a plan view of a large vessel arranged for boiling a large number of eggs. Fig. 4 is a detail in perspective of a valve for regulating the time, and Fig. 5 is a sectional view.

1 represents a vessel adapted to contain boiling water and one or more of the boilers hereinafter to be described. Where the vessel contains more than one boiler, suitable guides 2 are provided in order to hold them upright. The boiler itself comprises a body portion 3, having a closed chamber or float 4 at the lower end. The upper portion above the float is constructed to form a reservoir 5. At the lower end is a hole 6, which is closed by a door 7, sliding in guides 8. By adjusting the size of the aperture the length of time necessary to discharge the reservoir can be varied, so that the eggs can be cooked to any desired degree. The bottom 9 of the reservoir is inclined so that all the water can run out of the reservoir.

10 represents a suitable basket adapted to go into the reservoir to contain the eggs or other articles to be cooked and is preferably provided with a handle 11 to permit easy handling of the eggs. The eggs having been placed in the basket and the latter in the reservoir, the reservoir is pushed downward until it fills with water. This can be done with the handle 11. The float is so proportioned that it is capable of sustaining the boiler, as shown in Fig. 2, when the reservoir is empty. The reservoir is sufficiently large to contain a volume of water greater than that displaced by the float. When the reservoir is filled, the float will be submerged; but on account of its buoyancy it will raise the reservoir and its contained water until equilibrium is established. The level of the water in the reservoir will thus be higher than the level of the water in the tank, and a head will be established tending to make the water run out of the reservoir through the valve 7. As the water runs out of the reservoir the float loses its equilibrium and tends to raise the reservoir to restore the head of water, in this manner raising any articles contained in the reservoir or connected therewith. The float thus continually tends to rise and the rise is controlled by the valve 7. The faster the water can run out the faster the float will rise and the shorter the time in which the eggs will be exposed to the heat.

It will be obvious that modifications and changes may be made without departing from the scope of the invention, and I do not desire to be limited to the exact construction I have shown and described. For instance, it is not essential that the eggs be carried within the reservoir, as they could be as well carried elsewhere, provided that they be raised out of the water when the reservoir becomes emptied. It has been found more convenient and less space is occupied if the eggs are placed in the reservoir, as herein shown.

I have herein described the invention for use in boiling eggs; but I do not restrict the invention to such specific use, as it can be employed for various purposes where it is desired to expose an article to heat for a certain length of time and then withdraw it. In cases where a number are used in one large vessel some will be set for one minute, some for two minutes, &c., and may also be suitably marked to prevent confusion.

Having thus described my invention, I declare that what I claim as new, and desire to secure by Letters Patent, is—

1. An egg-boiler comprising a float, and a reservoir rigidly attached thereto having a vent in its lower portion, the reservoir when full submerging the float, and the vent permitting the fluid to run out and the reservoir to rise, substantially as described.

2. An egg-boiler comprising a float, and a reservoir rigidly attached thereto having an adjustable vent in its lower portion, the reservoir when full submerging the float and the adjustable vent permitting the fluid to gradually run out and the reservoir to rise, substantially as described.

3. An egg-boiler comprising a tubular body having a transverse partition intermediate its ends forming a float at one end and a reservoir at the other, the reservoir having a vent adjacent the partition, substantially as described.

4. An egg-boiler comprising a tubular body having a transverse inclined partition intermediate its ends forming a float at one end and a reservoir at the other, the reservoir having a vent adjacent to the lower portion of the partition, substantially as described.

5. An egg-boiler comprising a body portion having a float in its lower end, a reservoir above the float adapted to contain the eggs and sufficient water to submerge the float when filled, and having an aperture in the bottom of the reservoir to permit the water in the reservoir to run out and thereby permit the float to raise the reservoir and the eggs out of the water, substantially as described.

6. The combination with a float, of a reservoir adapted to contain sufficient water to submerge the float, and means permitting the escape of the water from the reservoir to enable the float to raise the reservoir, substantially as described.

7. An egg-boiler comprising a float, an egg-carrier carried thereby, means for loading the float to submerge the egg-carrier, and means for discharging the load on the float to raise the egg-carrier, substantially as described.

In testimony whereof I affix my signature in presence of two witnesses.

ROYAL EARL DEANE.

Witnesses:
 JULIAN S. WOOSTER,
 GEO. RAWLINS.